US008817708B2

(12) United States Patent
Chen et al.

(10) Patent No.: US 8,817,708 B2
(45) Date of Patent: Aug. 26, 2014

(54) TD-SCDMA SYSTEM AND A METHOD FOR CONTROLLING HSUPA RANDOM ACCESS THEREOF

(75) Inventors: Hui Chen, Shenzhen (CN); Yincheng Zhang, Shenzhen (CN); Zhifeng Ma, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1027 days.

(21) Appl. No.: 12/438,011

(22) PCT Filed: Aug. 15, 2007

(86) PCT No.: PCT/CN2007/002463
§ 371 (c)(1),
(2), (4) Date: Feb. 19, 2009

(87) PCT Pub. No.: WO2008/025233
PCT Pub. Date: Mar. 6, 2008

(65) Prior Publication Data
US 2010/0165953 A1    Jul. 1, 2010

(30) Foreign Application Priority Data

Aug. 22, 2006 (CN) .......................... 2006 1 0109897

(51) Int. Cl.
*H04W 4/00* (2009.01)
*H04W 72/12* (2009.01)
*H04W 74/08* (2009.01)
(52) U.S. Cl.
CPC ...... *H04W 72/1273* (2013.01); *H04W 74/0866* (2013.01)
USPC .......................................... 370/329; 455/450
(58) Field of Classification Search
None
See application file for complete search history.

(56) References Cited

U.S. PATENT DOCUMENTS 5,502,725 A * 3/1996 Pohjakallio ................... 370/337
7,248,887 B2 * 7/2007 Zhang et al. .................. 455/509
(Continued)

FOREIGN PATENT DOCUMENTS

CN          1250267 A     4/2000
CN       200410078018    3/2006
(Continued)

OTHER PUBLICATIONS

3 GPP TS25.224 V7.0.0, 3rd Generation Partnership Project; Technical Specification Group Radio Access Network; Physical Layer Procedures (TDD), (Release 7), Mar. 31, 2006 p. 34-38.
(Continued)

*Primary Examiner* — Mohammad Adhami
(74) *Attorney, Agent, or Firm* — McClure, Qualey & Rodack, LLP (57) ABSTRACT

The present invention provides a time division synchronous code division multiple access (TD-SCDMA) system for controlling enhanced uplink random access, including user equipment (UE), node B and serving radio network controller. The present invention also provides a method for controlling the enhanced uplink random access in a time division synchronous code division multiple access system, including: in high speed uplink packet access scheduling service of time division synchronous code division multiple access system, the higher layer of network side deploys a timer at the user equipment side; if the user equipment still needs to transmit data when the current available grant expires, it starts up the timer which is used as the delay time of initiating the enhanced uplink random access. According to the ability of the network side in controlling E-DCH resources, the present invention can be used to control the time delay that UE initiates the enhanced uplink random access after one grant expires, so as to avoid invalid random access; meanwhile the present invention provides a reliable mechanism for the enhanced uplink random access. By using the method of this invention, system resources can be reasonably utilized, thereby greatly improving the system efficiency.

14 Claims, 3 Drawing Sheets

(56) References Cited

U.S. PATENT DOCUMENTS

| | | | |
|---|---|---|---|
| 2004/0196870 A1 | 10/2004 | Cheng et al. | |
| 2007/0248099 A1* | 10/2007 | Liljestrom et al. | 370/395.4 |
| 2008/0008152 A1* | 1/2008 | Lohr et al. | 370/342 |
| 2008/0254804 A1* | 10/2008 | Lohr et al. | 455/442 |
| 2010/0284475 A1* | 11/2010 | Usuda et al. | 375/259 |

FOREIGN PATENT DOCUMENTS

| | | | |
|---|---|---|---|
| EP | 1379033 | * | 1/2004 |
| EP | 1379033 A1 | | 1/2004 |
| WO | 2004073337 A1 | | 8/2004 |

OTHER PUBLICATIONS

"3GPP Specification Evolution by ZTE Corporation," STLEE-PC, Jun. 29, 2011, IPC IP: 192.168.0.40.

"3rd Generation Partnership Project; Technical Specification Group Radio Access Network; 3.84 Mcps TDD Enhanced Uplink; RAN WG2 Stage 2 Decisions"; © 2004, 3GPP Organizational Partners (ARIB, ATIS, CCSA, ETSI, TTA, TTC).

Tallinn, Estonia; "SI Transmission Control in LCR TDD Enhanced Uplink"; Aug. 28, 2006 to Sep. 1, 2006.

\* cited by examiner

TD-SCDMA SYSTEM AND A METHOD FOR CONTROLLING HSUPA RANDOM ACCESS THEREOF

TECHNICAL FIELD OF THE INVENTION

The present invention relates to radio communication field, especially relates to a time division synchronous code division multiple access system and a method for controlling enhanced uplink random access thereof.

BACKGROUND OF THE INVENTION

The application for setting up enhanced uplink in TD-SCDMA (Time Division Synchronous Code Division Multiple Access) system was approved by 3GPP ($3^{rd}$ Generation Partnership Project) in March 2006. The enhanced uplink is generally called HSUPA (High Speed Uplink Packet Access), which aims for improving the efficiency of the uplink through advanced technique, thereby effectively supporting web browse, video, multimedia information and other IP-based services.

Although there is no complete technical report at present concerning the TD-SCDMA HSUPA technology of 3GPP, its basic technical framework has been developed, which can refer to the proposal and conference report about 3GPP conference held in Shanghai in May, as well as the technical framework related to the present invention in the following description.

A transmission channel E-DCH (Enhanced-uplink Dedicated transmission Channel) for carrying the enhanced uplink data is added in HSUPA, and the TTI (Transmission Time Interval) of the E-DCH is 5 ms.

The physical channels matching the E-DCH are:

E-AGCH (E-DCH absolute grant channel), which is a control channel used for Node B to transmit grant information;

E-PUCH (E-DCH physical uplink channel, also called enhanced physical uplink channel), which is a traffic channel used for the UE (User Equipment) to carry E-DCH encoding combination and scheduling related information;

E-RUCCH (E-DCH Random access Uplink Control Channel, namely HSUPA random access uplink control channel), which is a physical control channel used to transmit the scheduling related information when UE has not been granted, and which uses random access physical channel resource;

E-HICH (E-DCH hybrid automatic repeat request indication channel), which is a physical layer control channel used for Node B to carry HARQ (Hybrid Automatic Repeat Request) indication information.

According to scheduling method, HSUPA service is divided into scheduling service and non-scheduling service, wherein the non-scheduling service has its resource assigned to UE by SRNC (Serving Radio Network Controller), and its assignment method is the same as that of the dedicated channel in the prior art; In the scheduling service, SRNC assigns the HSUPA resource pool to Node B which then assigns resource to single UE and sends absolute grant information including power grant information and physical channel grant information to the UE through the E-AGCH. The power grant information is used to assign the available system interference resource among the competitive UEs; and the physical channel grant information is used to assign the time slot and code resource used by E-PUCH among the competitive UEs. One piece of grant information in the E-AGCH can be used by one UE each time, and the granted available minimal duration is one E-DCH TTI, or the grant of variable time interval is also supported by using RDI (Resource Duration Indication), for example, RDI can indicate the UE to use certain granted resource in the next 8 TTIs. The UE intercepts one group of E-AGCHs which are configured for the UE by the higher layer of network, and the UE reads the grant information once it decodes the information successfully, and sends data through the granted E-PUCH after the timing $n_{E\text{-}AGCH}$ prescribed by the protocol. The Node B decodes the received data in the E-PUCH, if decoding the data successfully, it returns ACK in the E-HICH; otherwise it returns NACK, meanwhile the UE needs to re-transmit the data according to retransmission mechanism.

In the scheduling service, the UE should submit some information for assisting the scheduling of Node B, which includes information of the UE buffer, margin of power and information of path loss measurement in present cell and neighboring cell. If the UE has a granted E-PUCH, the scheduling information will be sent through E-PUCH; otherwise, the information will be sent through E-RUCCH. When the UE has uplink data to be sent, the scheduling information may be triggered to be sent. The grant information is not sent to the UE at each TTI, rather, whether or not/when to send the information is completely decided by the scheduling function entity of Node B according to the current network condition and the priorities of each competitive UE.

Figure 1:
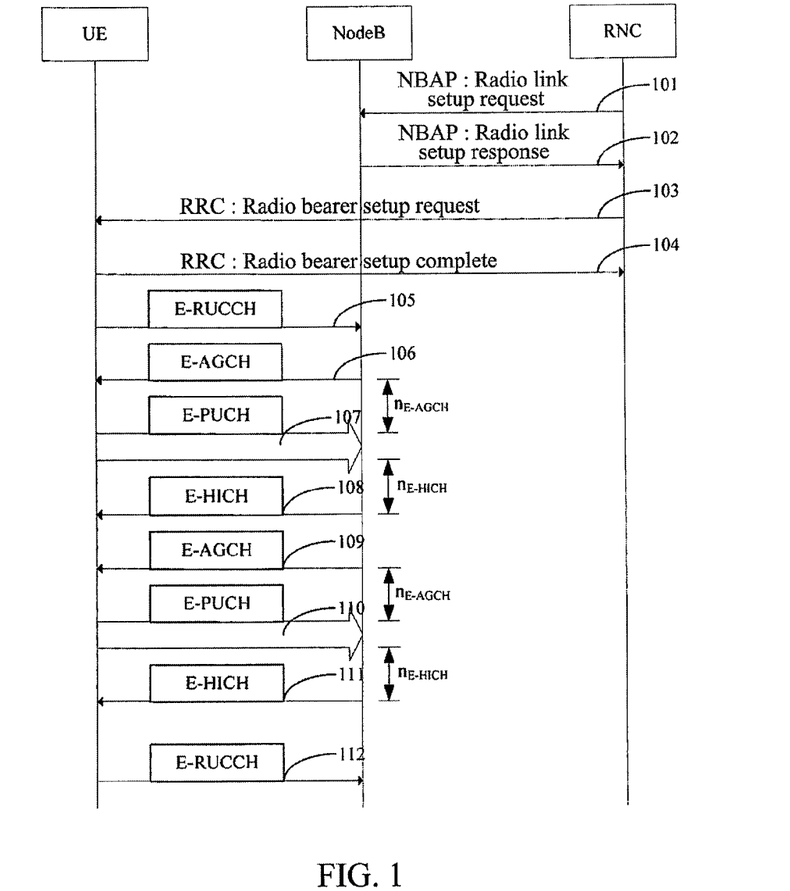
FIG. 1 is a flowchart of enhanced uplink configuration and data transmission in the prior art.

FIG. 1 shows the working process of HSUPA scheduling service, wherein RRC (Radio Resource Control) connection between the UE and the SRNC has been established prior to step 101, and the reason for connecting the UE is to initiate packet service. The specific steps in FIG. 1 are described as follows:

101: Through admission control process, the SRNC assumes that it can establish HSUPA for the UE and sends a message through NBAP (Node B Application Protocol) to Node B for starting radio link establishment process, the message including parameters related to the enhanced uplink access, such as the information about the transmission channel, E-DCH serving radio link number, and so on; If a radio link was established for the UE before, the enhanced uplink parameters are configured through radio link reconfiguration process.

102: Node B receives the configuration parameters and assigns E-AGCH and E-RNTI (E-DCH Radio Network Temporary Identification) in the enhanced uplink common resource pool of the cell for the UE, which are returned to the SRNC through the radio link setup response or radio link reconfiguration response of NBAP.

103: The SRNC sends radio bearer setup command to the UE through RRC protocol, the command includes the information of E-DCH configuration, E-PUCH, E-AGCH and E-HICH; if the process of radio bearer setup was performed before, the enhanced uplink access will be configured through radio bearer reconfiguration process.

104: The UE receives the configuration parameters and returns a response to the network side; and it is determined that the E-DCH transmission service is available according to the configuration parameters.

105: If the data amount in the logical channel buffer corresponding to the UE E-DCH is changed from 0 to non-0, the UE, with the scheduling information, initiates E-RUCCH random access process.

106: After the Node B detects the random access request sent by the UE, it adds the UE into the group of competitive UEs which use E-DCH resource, schedules the UE according to the resource condition of the cell, the QOS attributes of the enhanced uplink radio bearer of the UE as well as the scheduling information of the UE, and sends the grant information to the UE through E-AGCH after suitable resource has been assigned to the UE.

107: After the UE has received the E-AGCH, it sends data through the granted E-PUCH after the timing $n_{E\text{-}AGCH}$ prescribed by the protocol; if there are still data in the UE buffer to be sent, the scheduling information will also be sent.

108: Node B decodes the data on the E-PUCH and returns ACK/NACK information through the E-HICH.

109: If the last E-AGCH granted available time has been expired, the Node B continues to assign resource to the UE according to the scheduling strategy and sends the grant information through the E-AGCH.

110-111: same as steps 107 and 108.

112: If there are still data to be sent in the UE buffer but there is no grant information at present, the UE will apply resource through E-RUCCH.

There are two definite time sequence relationships: $n_{E\text{-}AGCH}$, which is decided by the protocol, is the timing interval between E-AGCH and the next first E-PUCH time slot; $n_{E\text{-}HICH}$, which is selected by Node B and configured for the UE through SRNC, is the timing interval between the last E-PUCH time slot in one E-DCH TTI and the corresponding E-HICH.

The problem in the existing technology is: in the scheduling service, if the UE still has data to be sent when one E-AGCH granted available time has been expired while Node B has no appropriate resource to be scheduled to the UE, that is, the UE has not received the next E-AGCH in time, whether will the UE immediately send the scheduling information through E-RUCCH or continue to intercept the E-AGCH? E-RUCCH is a random access physical channel; in TD-SCDMA, the random access should go through the uplink synchronization process which is performed by sending uplink synchronous code at UpPTS (Uplink Pilot Time Slot) and receiving the timing and power adjustment information from the corresponding FPACH (Fast Physical Access Channel), by referring to 3GPP TS25.224 protocol for details, it can be seen that the access process is relatively complicated. Moreover, E-RUCCH is a common channel and there is possibility of competition conflicts; the frequent initiation of E-RUCCH access not only wastes network resource but also makes the UE consume a lot of electricity; in addition, if Node B has no appropriate resource to be scheduled, even if the UE sends E-RUCCH immediately, it will not receive a response.

Moreover, due to the competitiveness of E-RUCCH, the reliability of E-RUCCH transmission mechanism should be considered to ensure that Node B could correctly receive the scheduling request from the UE.

SUMMARY OF THE INVENTION

In order to overcome the above defects, the present invention aims to provide a time division synchronous code division multiple access (TD-SCDMA) system and a method for controlling the enhanced uplink random access in High Speed Uplink Packet Access (HSUPA) scheduling service thereof, including the UE controlling the enhanced uplink random access through continuing to apply for resource after one granted transmission as well as controlling the random access reliably. The method largely improves the system efficiency.

The present invention offers a method for controlling the enhanced uplink random access in TD-SCDMA system, the method includes:

the higher layer at the network side deploying a timer at the UE side in HSUPA scheduling service in the TD-SCDMA system; starting up the timer which is used as the delay time to initiate the enhanced uplink random access if the UE still has data to send when the current available grant expires.

Furthermore, the control method also includes: transmitting data if the grant information from Node B has been received before the timer times out; otherwise, performing the random access of the enhanced uplink random access uplink control channel when the timer times out.

Furthermore, the control method specifically includes:

a. the network side deploying a timer at the UE side;

b. the UE sending new data according to the grant information from Node B and starting up the timer when the current available absolute grant expires;

c. stopping and resetting the timer and returning to step b if the UE receives the grant information from Node B before the timer has timed out; initiating the random access and sending the scheduling information to Node B on the enhanced uplink random access uplink control channel when the timer times out, and then resetting and stopping the timer.

Furthermore, in said step (1), the network side is serving radio network controller or Node B.

Furthermore, in said step a: if the value of the timer is configured by the serving radio network controller, the serving radio network controller configures the value of the timer according to the resource quantity of the enhanced uplink in the cell and statistical number of the users.

Furthermore, in said step a: if the value of the timer is configured by Node B and the synchronization command of the enhanced uplink physical channel is carried by E-AGCH, the upper limit of the value of the timer is the maximal time interval of the synchronization command.

Furthermore, if the value of the timer is configured by Node B, the value of the timer is forwarded to the UE by Node B through serving radio network controller.

Furthermore, in said step b, when the UE sends new data according to the grant information from Node B, if there are still data to be sent in the logical channel buffer corresponding to the enhanced uplink dedicated transmission channel, the scheduling information can also be sent together with the data.

Furthermore, in said step c, the random access on the enhanced uplink random access uplink control channel performed by the UE means: periodically triggering the random access on the enhanced uplink random access uplink control channel until receiving the grant of Node B.

Furthermore, in said step c, the random access on the enhanced uplink random access uplink control channel performed by the UE means: periodically triggering the random access on the enhanced uplink random access uplink control channel until the triggering times surpasses the maximal attempt times or until the grant of Node B is received.

The present invention also offers a TD-SCDMA system for controlling the enhanced uplink random access, including UE, Node B and serving radio network controller, wherein the UE includes a timer, the UE is used to start up the timer when there is still data to be sent when the current available grant expires; and the UE is also used to transmit the data if the UE receives the grant information from Node B before the timer times out; otherwise, the UE performs the random access on the enhanced uplink random access uplink control channel when the timer is timed out.

Furthermore, the serving radio network controller is used to configure the value of the timer according to the resource quantity of the enhanced uplink in the cell and the statistical number of the users, and include the value of the timer in the radio bearer setup or radio bearer reconfiguration command to be sent to the UE; and the UE is used to configure the timer according to the value.

Furthermore, Node B is used to set the value of the timer and make the value being carried in the response information fed back to the serving radio network controller; the serving radio network controller forwards the information in the radio bearer setup or radio bearer reconfiguration command to the UE; the UE configures the timer according to the value.

Furthermore, the random access on the enhanced uplink random access uplink control channel performed by the UE means: the UE periodically triggers the random access on the enhanced uplink random access uplink control channel until it receives the grant from Node B.

Furthermore, the random access on the enhanced uplink random access uplink control channel performed by the UE means: the UE periodically triggers the random access on the enhanced uplink random access uplink control channel until the triggering times surpasses the maximal attempt times or until the grant from Node B is received.

According to the ability of the network side for controlling the E-DCH resource, the present invention controls the time delay of the UE initiating the enhanced uplink random access after one grant, thereby avoiding invalid random access; meanwhile the present invention offers a reliability mechanism for the enhanced uplink random access. The method of the present invention enables the reasonable use of the system resource and largely improves the system efficiency.

PREFERRED EMBODIMENTS OF THE INVENTION

Figure 2:
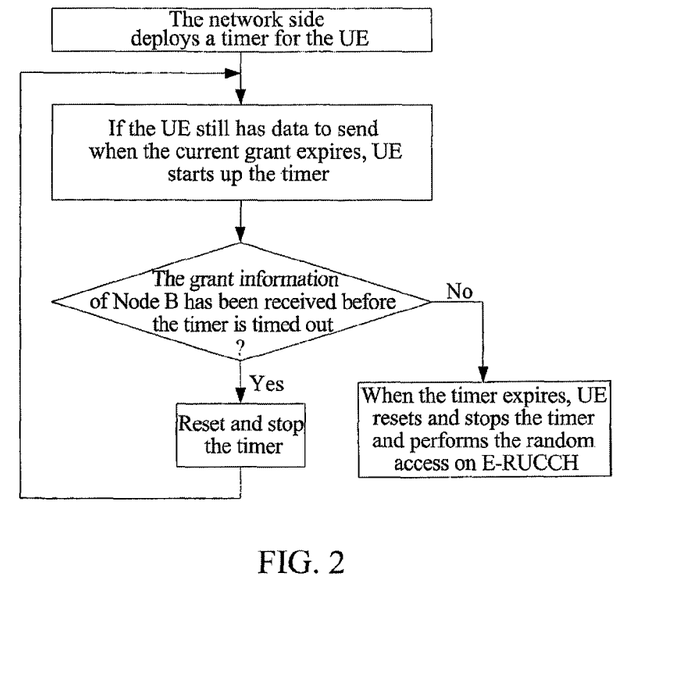
FIG. 2 is a flowchart of the method for controlling enhanced uplink random access in TD-SCDMA system in accordance with a specific embodiment of the present invention.

The present invention offers a method for enhanced uplink random access in HSUPA scheduling service, which is able to avoid invalid random access of the UE. The method will be described in further detail by taking TD-SCDMA system as an example, including the following steps as shown in FIG. 2:

step one: when the network side configures E-DCH radio resource for the UE, it configures a timer T_WAIT for the UE to control the delay time of initiating random access when the UE still has data to be transmitted if one E-AGCH granted period expires; the value of the timer T_WAIT is configured by the network side when setting up or reconfiguring E-DCH radio resource for the UE; the network side is serving radio network controller or Node B.

The timer T_WAIT is used to avoid unnecessary and frequent random accesses of the user, thereby avoiding the waste of network resource, so its configuration should be consistent with the scheduling frequency at the network side. To achieve this, there are two schemes:

Scheme 1: The timer T_WAIT is configured by SRNC which estimates the value of the timer T_WAIT, i.e. the length of timing, according to the HSUPA resource quantity in the cell of the UE and the statistical number of the HSUPA users; the value of the timer T_WAIT reflects the average frequency of scheduling for a single UE by the Node B. Table 1 shows the configuration of T_WAIT parameters, "M" in the column "Exist" means this element is MUST. In RRC protocol, this element exists in the processes related to radio bearer configuration/reconfiguration, physical resource configuration/reconfiguration, which includes the following radio resource control messages (RRC messages): CELL UPDATE CONFIRM, PHYSICAL CHANNEL RECONFIGURATION, RADIO BEARER RECONFIGURATION, RADIO BEARER RELEASE, RADIO BEARER SETUP, RRC CONNECTION SETUP, and TRANSPORT CHANNEL RECONFIGURATION.

TABLE 1

| Element Name | Exist | Comment |
| --- | --- | --- |
| T_WAIT | M | Integer |

Scheme 2: The value of the timer T_WAIT is configured by Node B; since Node B has access to controlling the scheduling of E-DCH resource, it grasps information of the current cell, such as the condition of HSUPA resource, the user number, interference, and so on, Node B selects a value of T_WAIT timer for the UE according to its own resource scheduling algorithm.

The E-DCH resource scheduling algorithm of Node B is based on the implementation of node B, the following factors are needed to be taken into consideration: the condition of HSUPA resource, the user number in the cell, the requirement for the interference suppression by E-DCH link in this cell, the requirement for the interference suppression by E-DCH link in this cell over the adjacent cell, the scheduling priority of the UE (which can be obtained from the QOS attribute of Radio bearer provided by SRNC).

In addition, the uplink synchronization maintenance mechanism of E-PUCH has not been determined. In R4/R5 version of 3GPP, the synchronization maintenance of uplink DPCH (Dedicated Physical Channel) is controlled by the synchronization command (SS) in the corresponding downlink physical channel of Node B, and the uplink synchronization maintenance of E-PUCH is controlled by the SS command in E-AGCH; when E-AGCH is paused for a period of time, the UE can use the SS command in the downlink DPCH (if exists) or other downlink channels, such as HS-SCCH (High Speed-Share Control Channel), to adjust the uplink synchronization. The UE will totally depend on the SS command in E-AGCH if there is no shared SS command. If the UE does not receive E-AGCH for a long period of time after it has sent E-PUCH, it will lose E-PUCH synchronization and should re-perform the uplink synchronization. Since the synchronization is totally controlled by Node B, Node B can consider the synchronization maintenance mechanism of E-PUCH link of the UE when it configures the value of timer T_WAIT for the UE; when the uplink synchronization maintenance of E-PUCH of the UE completely depends on the SS command in the E-AGCH, the upper limit of the value of T_WAIT should be the maximal time interval of SS command required by the uplink synchronization.

The configuration of the parameter of the timer T_WAIT in the above scheme 2 also could refer to Table 1, but it also appears in NBAP message and RRC message. In NBAP protocol, the element is configured in the response message of the following processes: RL Setup Request, RL Addition Request, RL Reconfiguration Prepare/Request; in RRC protocol, the element exists in the processes related to radio bearer configuration/reconfiguration, physical resource configuration/reconfiguration, which is the same as in Scheme 1.

Step two: the UE sends data according to the grant information from Node B; if the UE still has data to be sent after data has been sent in the last granted (namely the current E-AGCH grant) available TTI, the UE will start up the timer T_WAIT.

When the UE sends new data, if the logical channel buffer corresponding to E-DCH still has data to be sent, the scheduling information would probably be carried (the transmission of the scheduling information can be triggered according to a triggering mechanism of an event, specifically, the higher layer of the UE decides whether to send the scheduling information or not); Node B will save the scheduling information and always use the latest scheduling information for scheduling. The worst condition is that in the latest granted period, no data is sent successfully by the UE, in such condition, since the priority of retransmission is higher than the transmission of new data, Node B shall take precedence to consider the resource grant of retransmission; if there is no resource for retransmission, Node B will perform the scheduling according to the most recently received scheduling information.

The highest frequency for Node B to send E-AGCH to a UE means sending in each TTI. However, TD-SCDMA is a resource limited system, and the frequency of E-AGCH transmission is usually relatively low, Node B may even temporarily stop sending the grant information when the interference in the cell is serious or because of the requirement of congestion control.

After the UE has sent out the last TTI data in the latest E-AGCH granted period, if the UE still has data to be sent, the timer T_WAIT will be started up. On the one hand, the timer T_WAIT is started to wait for the next grant of Node B, on the other hand, its value is also possibly the limited by the E-PUCH uplink synchronization maintenance.

Step three: if the UE receives the grant information from Node B before the timer T_WAIT times out, the timer T_WAIT will be reset and stopped, and the next step will be performed according to the grant content, for example, it is to return to the second step; when the timer times out, the timer T_WAIT will be reset and stopped, and the random access on E-RUCCH (E-DCH Random access Uplink Control Channel) will be performed.

After the UE receives the grant information from Node B, another data transmission process starts according to the process of the above step two; if the timer T_WAIT is timed out which means that the grant information from Node B has not been received, the uplink synchronization and E-RUCCH access will be performed, and the timer T_WAIT will be reset and stopped. In other words, the timer T_WAIT provided by the present invention is the delay time that the UE needs to wait to initiate uplink random access and continually applying for the scheduling resource after the available grant expires.

When the UE starts up the random access of E-RUCCH, the access will be performed according to the process of the original PRACH (Physical Random Access Channel) random access procedure in the system; since the E-RUCCH is a competition conflict channel, the access has uncertainties; if no grant of Node B has been received during a certain period, the data can be guaranteed to be sent successfully through a certain mechanism, such as the mechanism of periodical timer+the maximal attempt times or the simple periodical timer mechanism.

In the mechanism of periodical timer+the maximal attempt times, after the UE sends the first E-RUCCH access, it starts up the periodical timer T_RUCCH and starts the counter. E-RUCCH is periodically triggered; each time the E-RUCCH is sent, the counter will be added with 1 until the maximal attempt times is surpassed or the grant of Node B is received. If the UE still does not receive the grant of Node B when the maximal attempt times has been reached, the higher layer of the UE will decide the operation of the next step. The value of the periodical timer T_RUCCH and the maximal attempt times may be set by the higher layer of the network.

In the simple periodical timer mechanism, the UE is not constrained by the maximal attempt times, and the E-RUCCH random access is periodically triggered until the grant of Node B is received.

The reliability control method of the above E-RUCCH random access is also suitable for the initial random access process when the data in the terminal buffer is changed from 0 to non-0.

Figure 3:
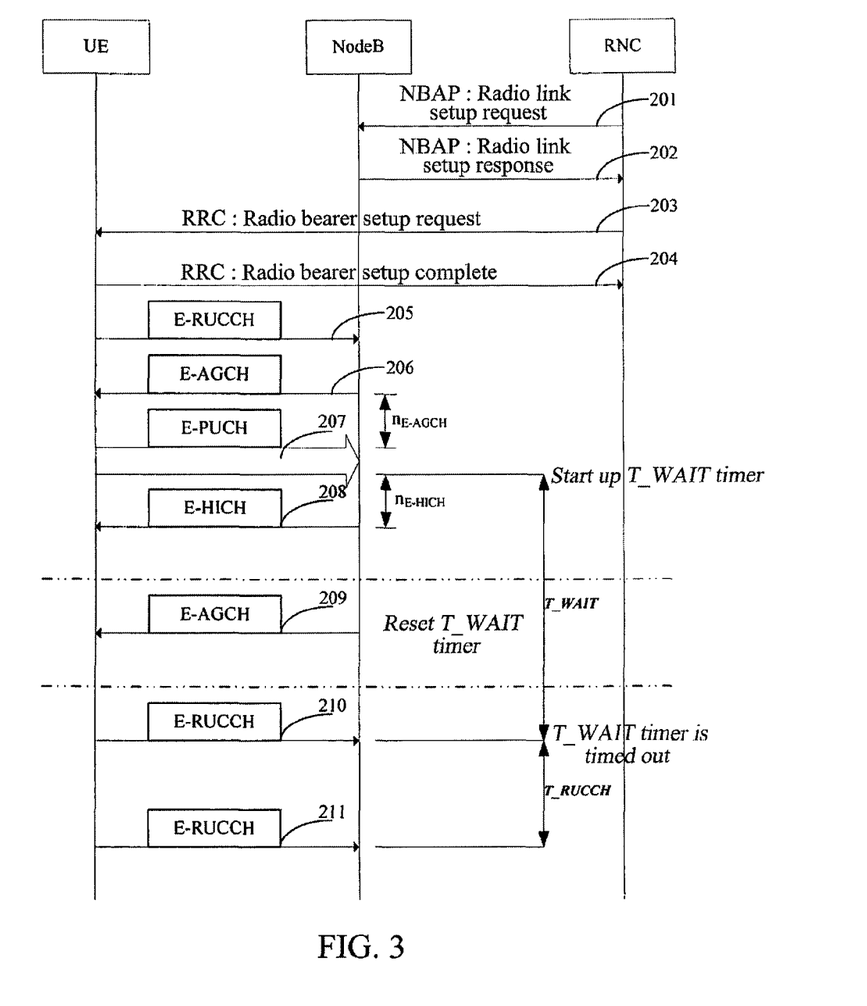
FIG. 3 is a flowchart of signaling configuration and data transmission in accordance with the method of the present invention.

FIG. 3 shows the processes of E-PUCH radio link configuration and data transmission of the UE in accordance with the present invention. RRC (Radio Resource Control) connection is set up between the UE and SRNC prior to step 201. The specific steps in FIG. 3 are as follows:

201: SRNC assumes that it can set up an enhanced uplink for the UE according to the admission control, then it requests Node B to set up E-PUCH radio link for the UE through the process of radio link setup or radio link reconfiguration in NBAP protocol, the request message includes the parameters related to HSUPA, such as the information related to transmission channel, E-DCH serving radio link number, and so on; If a radio link has already been set up for the UE before, the HSUPA parameters will be configured through the process of radio link reconfiguration;

202: Node B receives the configuration parameters and assigns for the UE the E-AGCH, E-HICH and E-RNTI (Radio Network Temporary Identification) in the enhanced uplink common resource pool in the cell, and returns the parameters back to SRNC through NBAP radio link setup response or radio link reconfiguration response; when the timer T_WAIT is configured by Node B, the response message also includes the value of T-WAIT selected by Node B for the UE;

203: SRNC sends the radio bearer setup command to the UE through RRC protocol, which includes the information of E-DCH transport channel configuration, E-PUCH, E-AGCH, E-HICH and T_WAIT; if the radio bearer setup process was already performed before, the configuration related to the enhanced uplink access will be performed through the process of radio bearer reconfiguration. When the above scheme one is applied, the value of T_WAIT is selected by SRNC for the UE; when the above scheme two is applied, the value of T_WAIT is configured by Node B and forwarded to the UE by SRNC;

204: UE receives the configuration parameters and returns a response message to the network side; the current E-DCH transmission service is determined to be available according to the configuration parameters;

205: When the data amount in the logical channel buffer corresponding to the UE E-DCH is changed from 0 to non-0, the UE initiates the process of E-RUCCH random access, with the scheduling information being carried;

206: After Node B detects the random access request from the UE, it adds the UE to the competitive UE group using E-DCH resource, schedules the UE according to the current resource condition, the QoS attribute of the UE and the UE scheduling information, and sends the grant information to the UE through E-AGCH after appropriate resource has been assigned;

207: After the UE receives the grant information in E-AGCH, it sends data in the granted E-PUCH after the timing $n_{E\text{-}AGCH}$; if there are still data to be sent in the UE buffer, the scheduling information will also be sent therewith; when there is no granted resource after the current TTI, namely, the current TTI is the last TTI in the current absolute grant, and if the UE still has data to be sent, the UE will initiate the timer T_WAIT after the UE has finished sending the data in E-PUCH in the current TTI;

208: Node B decodes the data in E-PUCH and returns ACK/NACK information in E-HICH.

In step 207, if the UE starts up the timer T_WAIT, there may be two conditions:

Condition 1: 209: If the UE receives the E-AGCH grant information from Node B before the timer times out, it resets and stops the timer, repeats the process from step 207 to continue to send the data;

Condition 2: 210: The UE resets and stops the timer when the timer times out, then performs step 211, namely, initiating the process of E-RUCCH random access.

Step 209, step 210 and step 208 can be performed in parallel.

211: The UE periodically triggers E-RUCCH according to the periodical timer T_RUCCH, each time the E-RUCCH is triggered, the value of the counter will be added with 1 until the triggering times, namely the value of the counter, surpasses the maximal attempt times or until the grant of Node B is received; when receiving the grant information of Node B, the process will be repeated from step 207. The counter is only a specific implementation mode, but it can also be realized by other implementation modes as long as the triggering times is recorded.

Of course, in practical application, it is also feasible that in step 211 the triggering times is not counted, and the UE periodically triggers E-RUCCH until the grant is received.

The present invention also provides a TD-SCDMA system for controlling the enhanced uplink random access, including UE, Node B and SRNC.

Through admission control, the SRNC assumes that the enhanced uplink can be set up for the UE which initiates connection, then it requests Node B to set up E-PUCH radio link for the UE through the radio link setup process in NBAP protocol, and the request message includes parameters related to HSUPA, such as the information related to the transmission channel and the E-DCH serving radio link number; If the UE has been in the status of connection and there is already a radio link set up for the UE before, the HSUPA parameters will be configured through the process of radio link reconfiguration; the SRNC is also used to send the radio bearer setup command to the UE through RRC protocol after the response from Node B has been received, and the commend includes the information of E-DCH transport channel configuration, E-PUCH, E-AGCH, E-HICH, the timer T_WAIT etc.; if the process of radio bearer setup was performed before, the configuration related to the enhanced uplink access will be performed through the process of radio bearer reconfiguration. If the response returned by Node B has the information of the timer T_WAIT, the SRNC will only be used to forward this information to the user equipment in the command of radio bearer setup or radio bearer reconfiguration; otherwise, the SRNC will also be used to set the value of the timer T_WAIT according to the enhanced uplink resource quantity in the cell and the statistical number of the users, and include the value of timer T_WAIT into the command of radio bearer setup or radio bearer reconfiguration to be sent to the UE.

Node B is used to receive the configuration parameters sent by the SRNC and assigns E-AGCH, E-HICH and E-RNTI in the enhanced uplink common resource pool in the cell to the UE which initiates the connection, and return the information to the SRNC through the radio link setup response or radio link reconfiguration response of the NBAP; when the timer T_WAIT is configured by Node B, Node B will also be used to select the value of the timer T_WAIT for the UE which initiates the connection and carry the value in the response message fed back to the SRNC. Node B is also used to schedule the UE according to the current resource condition, QoS attribute of the UE and the UE scheduling information, and send the grant information to the UE through E-AGCH after appropriate resource has been assigned to the UE; Node B is also used to decode the data sent by the UE in the E-PUCH and return ACK/NACK information in the E-HICH to the UE correspondingly.

The UE includes a timer T_WAIT; the UE is used to initiate a connection and return a response message to the network side after it has received the configuration parameters sent by the SNRC, determine that the current E-DCH transmission service is available according to the configuration parameters and configure the timer according to the value of T-WAIT; and the UE is also used to initiate the process of E-RUCCH random access when the data amount in the logical channel buffer corresponding to UE E-DCH is changed from 0 to non-0, wherein the scheduling information is carried; the UE is also used to send data in the granted E-PUCH after it has received the grant information in E-AGCH after the timing $n_{E-AGCH}$, wherein the scheduling information will also be sent therewith if there are still data to be sent in the UE buffer, and when there is no granted resource after the current TTI, namely, the current TTI is the last TTI in the current available absolute grant, and if the UE still has data to be sent, the UE will initiate the timer T_WAIT after it has finished sending the data in the current TTI through E-PUCH; the UE is also used to reset and stop the timer when it receives the E-AGCH grant information of Node B before the timer is timed out, and reset and stop the timer T_WAIT after the timer is timed out, and then initiate the process of E-RUCCH random access.

The process of the UE initiating the E-RUCCH random access means: the UE periodically triggers the E-RUCCH according to the periodical timer T_RUCCH, each time the E-RUCCH is triggered, the value of the counter will be added with 1 until the triggering times, namely the value of the counter, surpasses the maximal attempt times or the grant of Node B is received. Of course, in practical applications, it is also feasible that the triggering times is not counted, the E-RUCCH is continuously periodically triggered until the grant is received. The counter is only a specific implementation mode, but it can also be realized by other implementation modes as long as the triggering times is recorded.

The present invention can be used to control the time delay for the UE to initiate the random access after one grant according to the ability of the network side in controlling the E-DCH resource, thereby avoiding the invalid random access and enabling reasonable use of system resource; meanwhile, in view of the conflict of random access, the present invention also provides a reliable transmission method for the random access.

Of course, the present invention may have many other embodiments. Therefore, without departing from the spirit and essence of the present invention, those skilled in the art can make various modifications or variations which should belong to the protection scope of the appended claims of the present invention.

Industrial Applicability

The present invention can be used to control the time delay for the UE to initiate the enhanced uplink random access after one grant expires according to the ability of the network side in controlling the E-DCH resource, thereby avoiding invalid random access and saving resources; meanwhile, the present invention provides a reliability mechanism for the enhanced uplink random access. The present invention enables reasonable use of system resource and largely improves the system working efficiency.

What we claim is:

1. A method for controlling enhanced uplink random access in a time division synchronous code division multiple access system, comprising:
   deploying a timer at UE side by a higher layer at network side in high speed uplink packet access scheduling service in the time division synchronous code division multiple access system;
   after a current available grant expires, starting up the timer;
   using the timer to delay initiating the enhanced uplink random access after the current available grant expires when the UE still has data to be sent;
   transmitting the data when grant information from Node B has been received before the timer times out;
   performing random access of enhanced uplink random access uplink control channel when the timer times out and the grant information from Node B has not been received;
   stopping and resetting the timer by the UE when the UE receives the grant information from Node B before the timer has timed out.

2. The method of claim 1, specifically comprising:
   a. deploying the timer at the UE side by the network side;
   b. sending new data by the UE according to the grant information from Node B and starting up the timer by the UE when a current available absolute grant expires; and
   c. stopping and resetting the timer by the UE if the UE receives the grant information from Node B before the timer has timed out, then return to step b; initiating the random access and sending scheduling information to Node B, on the enhanced uplink random access uplink control channel by the UE when the timer times out, then resetting and stopping the timer.

3. The method of claim 2, wherein in said step (a), the network side is a serving radio network controller or Node B.

4. The method of claim 3, wherein in said step a, if a value of the timer is configured by the serving radio network controller, the serving radio network controller configures the value of the timer according to resource quantity of the enhanced uplink in a cell and a statistical number of users.

5. The method of claim 3, wherein in said step a: if the value of the timer is configured by Node B and a synchronization command of enhanced uplink physical channel is carried by E-AGCH, then an upper limit of the value of the timer is a maximal time interval of the synchronization command.

6. The method of claim 3, wherein if the value of the timer is configured by Node B, the value of the timer will be forwarded to the UE by Node B through the serving radio network controller.

7. The method of claim 2, wherein in said step b, when the UE sends the new data according to the grant information from Node B, if there are still data to be sent in logical channel buffer corresponding to enhanced uplink dedicated transmission channel, the scheduling information may be carried together with the data.

8. The method of claim 2, wherein in said step c, performing the random access on the enhanced uplink random access uplink control channel by the UE means periodically triggering the random access on the enhanced uplink random access uplink control channel until the grant of Node B is received.

9. The method of claim 2, wherein in said step c, performing the random access on the enhanced uplink random access uplink control channel by the UE means periodically triggering the random access on the enhanced uplink random access uplink control channel until a triggering times surpasses a maximal attempt times or until the grant of Node B is received.

10. A time division synchronous code division multiple access system for controlling enhanced uplink random access, comprising UE, Node B and serving radio network controller, wherein said UE is configured to
    receive a timer from a higher layer in high speed uplink packet access scheduling service in the time division synchronous code division multiple access system;
    after a currently available grant expires, start up the timer;
    using the timer to delay initiating the enhanced uplink random access after the currently available grant expires when there are still data to be sent;
    transmit the data when grant information from the Node B has been received before the timer is timed out;
    perform the random access on enhanced uplink random access uplink control channel when the timer is timed out and the grant information from the Node B has not been received; and
    stop and rest the timer when the UE receives the grant information from the Node B before the timer has timed out.

11. The system of claim 10, wherein the serving network radio controller is configured to configure a value of the timer according to resource quantity of the enhanced uplink in a cell and a statistical number of users, and make the value of the timer included in radio bearer setup or radio bearer reconfiguration command to be sent to the UE; and the UE is used to configure the timer according to said value.

12. The system of claim 10, wherein Node B is configured to set the value of the timer which is carried in response information fed back to the serving radio network controller; the serving network radio controller is used to forward the information in the radio bearer setup or radio bearer reconfiguration command to the UE; the UE is configured to configure the timer according to the value.

13. The system of claim 10, wherein performing the random access on the enhanced uplink random access uplink control channel by the UE means that the UE periodically triggers the random access on the enhanced uplink random access uplink control channel until the grant from Node B is received.

14. The system of claim 10, wherein performing the random access on the enhanced uplink random access uplink control channel by the UE means that the UE periodically triggers the random access on the enhanced uplink random access uplink control channel until a triggering times surpasses a maximal attempt times or until the grant from Node B is received.

* * * * *